(12) United States Patent
O'Connell

(10) Patent No.: US 10,748,415 B2
(45) Date of Patent: *Aug. 18, 2020

(54) METHOD FOR SENSOR MAINTENANCE OF REDUNDANT SENSOR LOOPS

(71) Applicant: True Analytics, LLC, Dover, DE (US)

(72) Inventor: Daniel O'Connell, Minneapolis, MN (US)

(73) Assignee: True Analytics, LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,234

(22) Filed: Nov. 12, 2018

(65) Prior Publication Data

US 2019/0080590 A1  Mar. 14, 2019

Related U.S. Application Data

(63) Continuation of application No. 15/452,676, filed on Mar. 7, 2017, now Pat. No. 10,127,800.

(60) Provisional application No. 62/305,435, filed on Mar. 8, 2016.

(51) Int. Cl.
| | |
|---|---|
| *G08B 29/04* | (2006.01) |
| *G01D 1/18* | (2006.01) |
| *G08B 5/36* | (2006.01) |
| *G08B 21/18* | (2006.01) |
| *G08B 29/18* | (2006.01) |

(52) U.S. Cl.
CPC .............. *G08B 29/04* (2013.01); *G01D 1/18* (2013.01); *G08B 5/36* (2013.01); *G08B 21/182* (2013.01); *G08B 29/185* (2013.01)

(58) Field of Classification Search
CPC ........ G08B 29/04; G08B 29/185; G08B 5/36; G08B 21/182; G01D 1/18
USPC .......................................................... 340/508
See application file for complete search history.

(56) References Cited

U.S. PATENT DOCUMENTS

| | | | | |
|---|---|---|---|---|
| 6,594,620 B1 * | 7/2003 | Qin | ........................... | G05B 9/02 702/183 |
| 2013/0191681 A1 * | 7/2013 | Moiseev | .................. | G05B 9/03 714/2 |

* cited by examiner

*Primary Examiner* — Omar Casillashernandez
(74) *Attorney, Agent, or Firm* — Buchalter, a professional corp.; Kari L. Barnes

(57) ABSTRACT

A system for performing sensor maintenance, including redundant sensors to collect one or more data points; one or more non-transitory storage mediums; a processor; and an output device; wherein one of the non-transitory storage mediums receives the one or more data points; wherein one of the non-transitory storage mediums includes one or more instructions for performing two or more statistical calculations; and wherein the processor carries out the instructions. The method for using the system includes: the non-transitory storage medium receiving one or more data points from the redundant sensors; the processor performing the statistical calculations on the data points to generate one or more processed data points and comparing the processed data points to a threshold value; and the non-transitory storage medium creating an alert when the processed data points exceed a threshold value for a period of time; and displaying the alert on the output device.

14 Claims, 4 Drawing Sheets

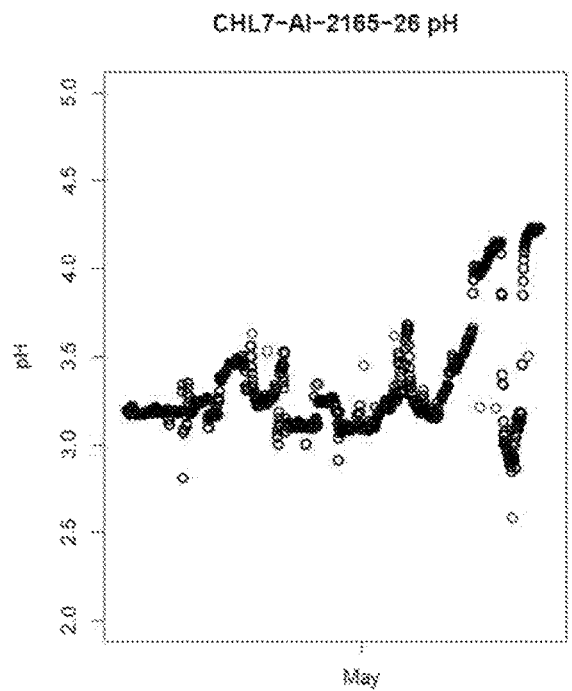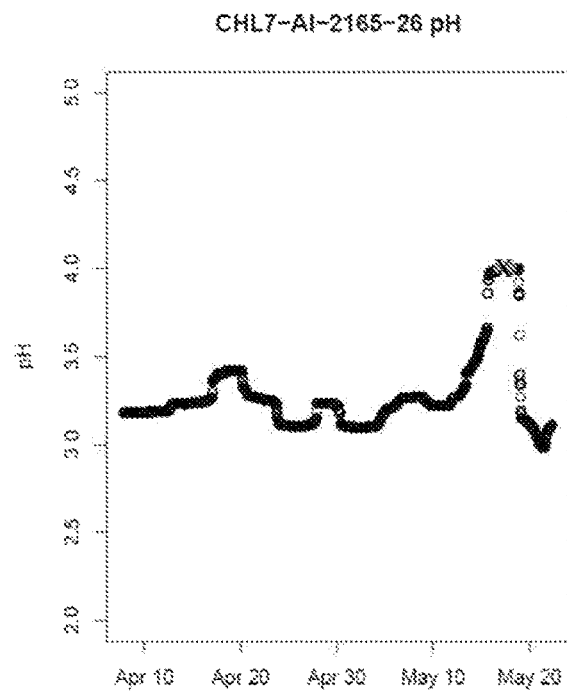
Fig. 2a    Fig. 2b
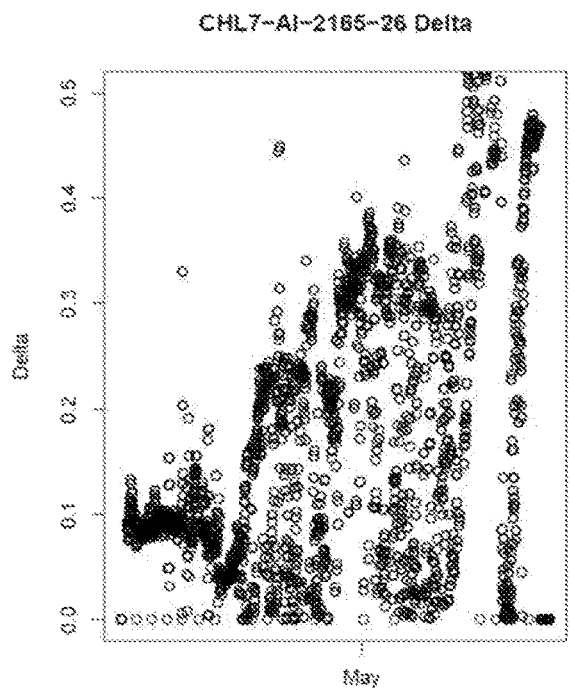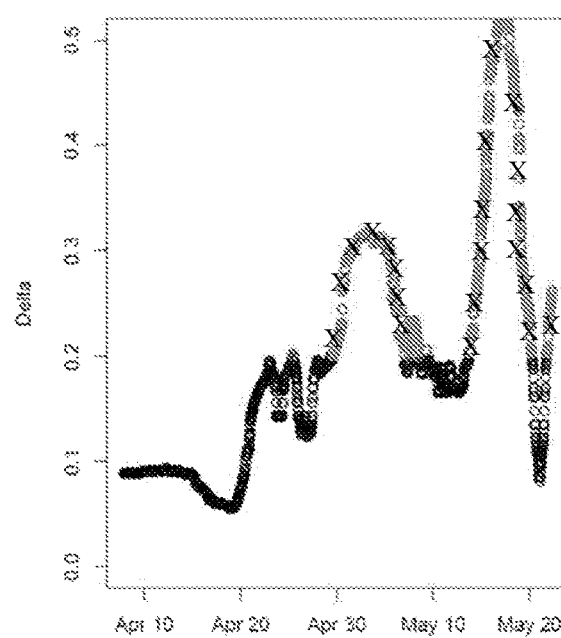
Fig. 2c    Fig. 2d

METHOD FOR SENSOR MAINTENANCE OF REDUNDANT SENSOR LOOPS

PRIORITY

The instant application claims benefit as a continuation to U.S. application Ser. No. 15/452,676, filed Mar. 7, 2017, which claims benefit to U.S. Provisional Application No. 62/305,435, titled "A Method of PH Sensor Maintenance of Redundant PH Loops," filed Mar. 8, 2016, each of which is incorporated herein by reference in its entirety.

BACKGROUND

Analytical sensors play a key role in many industrial processes and require attention to ensure accurate and reliable performance. In particular, sensors used in applications requiring highly accurate measurements of a process fluid which coats or fouls the sensor, require regular maintenance. Likewise, sensors with a limited life expectancy, such as Oxidation Reduction Potential (ORP), pH or conductivity sensors, also require constant attention. However, persistent maintenance of sensors can impact operational efficiency. At the same time, failure to properly maintain sensors negatively impacts operations potentially resulting in reduced product quality, over/under used reagents and unplanned downtime for cleaning or replacement.

Approaches to this issue have thus far been unsatisfactory. For example, one approach involves using a static maintenance schedule based on a best-historical guess to maintain a given level of pH accuracy. This may be supplemented by using many redundant sensors (three or more) over redundant pairs or a single sensor. This increases the number of probes consumed in a given time period and/or leaves one vulnerable to poor historical guesses or unusually poor pH performance. The result is subpar pH accuracy and/or excess maintenance and labor expense.

Another approach involves using diagnostics on board the individual sensor. This captures certain fail states, such as when the glass of a sensor is cracked or broken. However, this approach does not capture instances where the sensor is functioning, but performance may be less than desired because of the environment in contact with or immediately around the sensor.

Yet another method involves taking samples of a process fluid to determine if the sensors are out of tolerance. If a sample tested in the lab indicates the sensors are inadequate, they may request an offset of the data or that the sensor be replaced. Similarly, one can also use information from a process control system to determine when to remove sensors. If two redundant pH readings are sufficiently far apart at any given point, operations may require the sensors to be replaced. These approaches have significant rates of false positives—a temporary process upset or poor grab sample procedure result in sensors being replaced early and often. This not only increases maintenance and labor costs but also reduces on-site confidence in the pH measurement significantly.

Still another approach involves using temperature and process data from an individual sensor to determine its sensor life. This approach claims many of the same benefits, namely dynamically determining lifespan based on process conditions. However, this approach differs in that it uses a single sensor and attempts to constantly guess remaining sensor life.

SUMMARY

The present embodiments provide exemplary methods and systems for sensor maintenance.

In one embodiment, the method may include receiving data from at least two redundant sensors and performing statistical calculations based on data from the at least two redundant sensors.

In another embodiment, a system for sensor maintenance may include at least two redundant sensors; a non-transitory machine readable storage medium that may include instructions for performing statistical calculations based on data from the at least two redundant sensors; and a processor for executing the instructions for performing statistical calculations.

Within the context of the present embodiments "sensor" and "sensors" generally refer to any analytical sensor.

Exemplary embodiments described herein may be used for optimizing sensor performance thereby minimizing replacement, labor, maintenance and raw materials costs. In particular, methods and systems according to embodiments described herein may be used that do not attempt to optimize a process by guessing remaining sensor life. The present approach or combinations of elements disclosed may provide different advantages. For instance, exemplary embodiments may have a very low rate of false positives—simply removing the sensors at the first sign of potential inaccuracy results in a significantly high rate of false positives because of process upsets, shutdowns, maintenance issues relating to other devices, and other day-to-day plant operations. Exemplary embodiments may also permit removal in cases of unusually poor performance outside the expected bounds (e.g. sensors that should be pulled in 16 days instead of the usual 30 days). Therefore, embodiments described herein may effectively optimize sensor life for a given accuracy target, resulting in increased sensor, labor, and maintenance costs. Exemplary embodiments may improve sensor lifespan or utility up to three times as long as the worst quartile of performers. This would imply that maintenance needs could be cut in half while ensuring similar accuracy to the base case where sensors are removed according to the worst performers.

BRIEF DESCRIPTION OF THE DRAWINGS

FIG. 2a illustrates data as received by a first redundant sensor plotted over a given time period.

FIG. 2b illustrates data as received by a second redundant sensor plotted over a given time period.

FIG. 2c illustrates the difference between the data, as received, between two redundant sensors.

FIG. 2d illustrates the difference between the data, after one or more statistical calculations have been applied, between two redundant sensors.

DETAILED DESCRIPTION OF THE DRAWINGS

Figure 1:
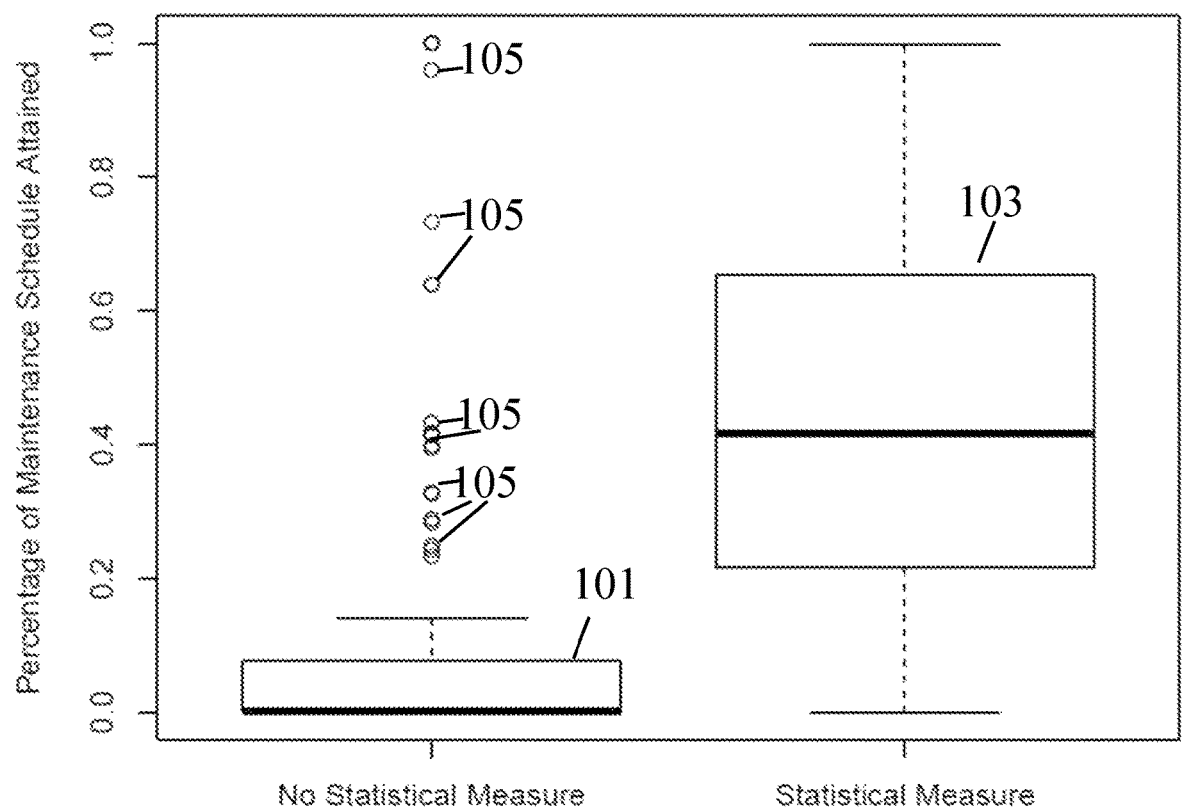
FIG. 1 compares a boxplot data as received to a boxplot of data after one or more statistical calculations have been applied.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

As used herein, the terms "about," "substantially," or "approximately" for any numerical values, ranges, shapes, distances, relative relationships, etc. indicate a suitable dimensional tolerance that allows the part or collection of components to function for its intended purpose as described herein.

Exemplary embodiments are directed to systems and methods for optimizing sensor performance and improving usable sensor lifespan. This disclosure provides a system and a method for performing sensor maintenance in order to optimize the performance of the sensor. The present embodiments provide exemplary methods and systems for sensor maintenance. An analytical sensor may be a consumable sensor that is generally made of glass or degrades quickly. Therefore, these sensors may require periodic replacement and/or maintenance when their readings go out of alignment. A redundant sensor, as used herein, generally refers to two or more sensors that are positioned to measure the same phenomenon. In a specific case, a redundant, back-up sensor may be positioned such that the two or more sensors are positioned and/or configured to measure the same parameter under the same conditions. In this case, the redundant, back-up sensors are generally positioned in close proximity, in a process line having the same conditions. Therefore, a redundant, back-up sensor may have approximately the same configuration, orientation, location, etc. to measure be able to measure a parameter under the same conditions. Although described as applicable to analytical sensors, the invention is not so limited. Other sensors may be used, such as, for example, flow meters.

In one embodiment, the method may include receiving data from at least two redundant sensors and performing statistical calculations based on data from the at least two redundant sensors. Based on the statistical calculation, which may be observed repetitively over a sequential number of samples or over a period of time, the operational functionality of the sensor may be determined. The sensor may then be removed if determined to be faulty or at least reviewed to determine if maintenance is required. The sensor may remain if determined to be operationally functional.

In another embodiment, a system for sensor maintenance may include at least two redundant sensors; a non-transitory machine readable storage medium that may include instructions for performing statistical calculations based on data from the at least two redundant sensors; and a processor for executing the instructions for performing statistical calculations. The instructions, when executed by the processor, may provide information necessary to determine if sensor maintenance is required or may determine directly if sensor maintenance is or is not required.

In an exemplary embodiment, the system may use at least two sensors to obtain data on any parameter. In an exemplary embodiment, the system may include at least three redundant sensors. This may allow for triangulating between multiple sensor data points to assess if maintenance is required without having to guess the remaining sensor life. The sensors may have additional features. For instance, at least one sensor may include a processor to allow for calculations on the sensor itself before transmitting the data for storage or further processing. Moreover, the on-board processor may include calibration and other sensor-related settings. The sensor may include a communication mechanism, such as a wired or wireless communication port for communicating with other sensors and/or with a remote computer or processor.

In an exemplary embodiment at least one non-transitory machine readable storage medium may include instructions that, when executed by a processor, perform one or more statistical calculations based on data from the plurality of sensors.

In an exemplary embodiment, the system may include a device for receiving and/or transmitting data from one or more sensors to a non-transitory machine readable storage medium. The device may be communicatively connected to at least one sensor and the storage medium. This connection may be wired or wireless.

In an exemplary embodiment, the instructions for performing the statistical calculations may reside on the non-transitory machine readable storage medium. For example, the data may be collected and analyzed locally before a notification is sent. The data may also be analyzed remotely. In an exemplary embodiment, the data may be analyzed and a notification or alert may be provided in response to the analysis.

In an exemplary embodiment, one or more non-transitory machine readable storage mediums may store instructions for performing the statistical calculations or functions described herein.

In an exemplary embodiment, data from the redundant sensors may be collected in any manner suitable for analysis such as performing the statistical calculations. In an exemplary embodiment, data from the sensors may be collected at a predetermined time interval. The data may then be analyzed by the processor or stored in the non-transitory machine readable storage medium.

The data may be analyzed to assess sensor performance and determine if maintenance or attention to the sensor is required. The results of the statistical calculations may be compared to a pre-set threshold value to determine whether maintenance is required. In the event the result of the statistical calculations exceeds the pre-set threshold value, the processor may send a notification or alert. In an exemplary embodiment, the out of range statistical calculation is observed over sequential samples or over a period of time to determine if the sensor is ready a localized statistical anomaly (a local system fluctuation) or is experiencing a system malfunction (such as sensor failure or environmental blockage to the sensor). If the statistical calculation is out of range over a predefined number of samples or over a predefined amount of time, the system may send a notification or alert.

In an exemplary embodiment, a system for performing sensor maintenance may include at least two redundant sensors, a computation system for analyzing data from the at least two sensors, and a device communicatively coupled to the computation system and/or the at least two sensors. The computation system may include at least one non-transitory machine readable storage medium encoded with instruction that when executed by a processor perform statistical calculations on the received data from the sensors, and compare the statistical calculations against a predefined set of rules to determine if the statistical calculation indicates a sensor out of compliance. The computation system may also include the processor for executing the instructions. Further, the computation system may include instruction for sending maintenance notifications if the comparison indicates a sensor out of compliance.

A method for performing sensor maintenance includes receiving data from at least two redundant sensors, analyzing the retrieved data from the at least two redundant sensors to obtain statistical values, and based on a comparison of the statistical values, displaying a message or providing a notification if maintenance is required.

Exemplary embodiments described herein may be used for optimizing sensor performance thereby minimizing replacement, labor, maintenance and raw materials costs. In particular, methods and systems according to embodiments described herein may be used that do not attempt to optimize a process by guessing remaining sensor life. The present approach or combinations of elements disclosed may provide different advantages. For instance, exemplary embodiments may have a very low rate of false positives—simply removing the sensors at the first sign of potential inaccuracy results in a significantly high rate of false positives because of process upsets, shutdowns, maintenance issues relating to other devices, and other day-to-day plant operations. Exemplary embodiments may also permit removal in cases of unusually poor performance outside the expected bounds (e.g. sensors that should be pulled in 16 days instead of the usual 30 days). Therefore, embodiments described herein may effectively optimize sensor life for a given accuracy target, resulting in increased sensor, labor, and maintenance costs. Simulations revealed this approach suggests a majority of sensors last up to three times as long as the worst quartile of performers. This would imply that maintenance needs could be cut in half while ensuring similar accuracy to the base case where sensors are removed according to the worst performers.

In an exemplary embodiment, the disclosure provides a method for performing sensor maintenance. The method may include receiving data from at least two redundant sensors at a non-transitory machine readable storage medium; and performing one or more statistical calculations on the data from the at least two redundant sensors by a processor communicatively coupled to the non-transitory machine readable medium and sending an alert when the statistical calculations exceed a pre-set threshold value for a predetermined amount of time. The method may also include placing two or more redundant sensors and at least one non-redundant sensor in a process or reaction.

In an exemplary embodiment, the system may include at least three redundant sensors. This may allow for triangulating amongst multiple sensor data points to assess if maintenance is required without having to guess the remaining sensor life.

In an exemplary embodiment, the redundant sensors may be placed substantially close to each other. This may allow for a more accurate comparison amongst the data received from the redundant sensors.

Figure 4:
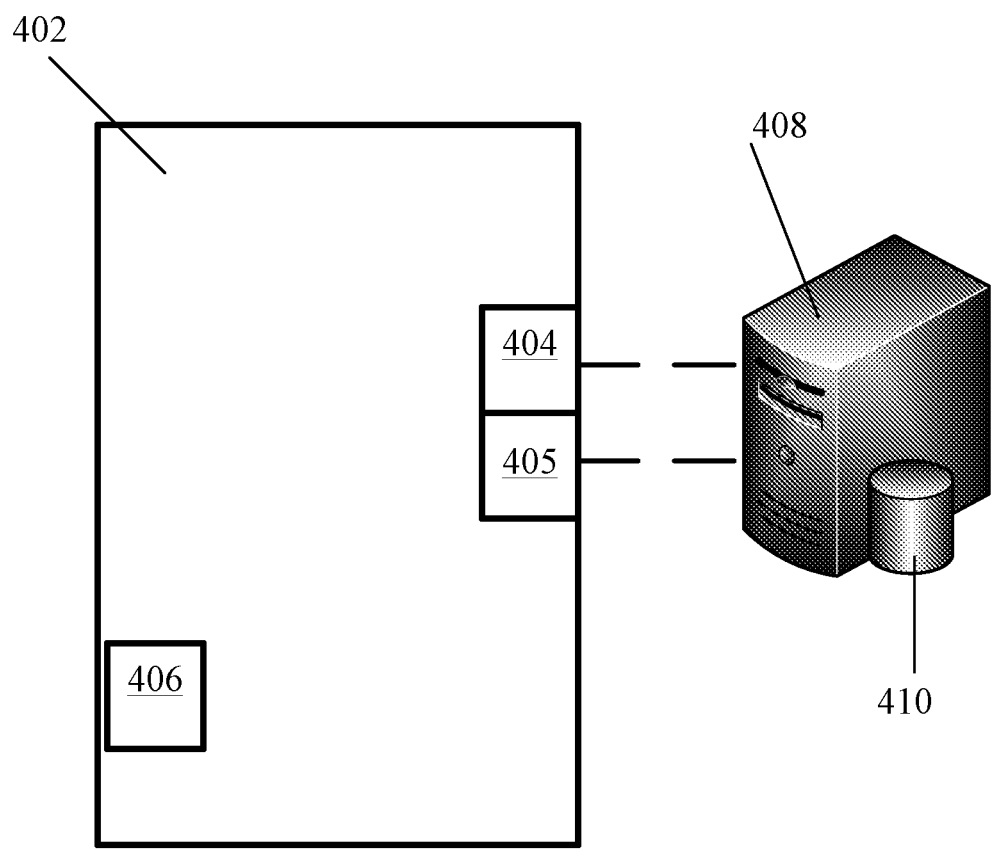
FIG. 4 illustrates an exemplary system according to exemplary embodiments described herein.

FIG. 4 illustrates an exemplary system according to exemplary embodiments described herein. In an exemplary embodiment, the disclosure provides a system 402 for performing sensor maintenance. The system may include more than two sensors 404-406; a non-transitory machine readable storage medium 410; and a processor 408. At least two 404-405 of the two or more sensors 404-406 may be redundant sensors. The non-transitory storage medium 410 may include instructions for performing one or more statistical calculations on the data from the at least two redundant sensors 404-405. The processor 408 may carry out the one or more statistical calculations.

In an exemplary embodiment, the data may be stored on site where data is collected or remotely in a server. In an exemplary embodiment, the instructions for performing the statistical calculations may reside on a local or remote storage medium from the sensor. For example, the data may be collected and analyzed locally before a notification is sent. Alternatively, or in addition thereto, the data may be analyzed remotely. In an exemplary embodiment, the data may be analyzed on a processor such as, but not limited to, a remote device such as a laptop, desktop, mobile electronic device (smart phone or tablet), or other computer device and a notification may be substantially instantly provided to the device user. In some instances, the system may send notification to other devices.

In an exemplary embodiment, the redundant and non-redundant sensors may have additional features such as, but not limited to, a processor. This can permit calculations on the sensor itself before transmitting the data to the non-transitory storage medium. Moreover, the on-board processor may also include calibration and other sensor-related settings.

In an exemplary embodiment, the system may include a device for receiving and/or transmitting data from the sensors to the non-transitory storage medium. The device may be communicatively connected to the sensors and the non-transitory storage medium. This connection may be wired or wireless. For example, data may be transmitted over connections such as, but not limited to, Bluetooth, radio frequency, wifi, local area network, or internet. In some cases, the device may process data before transmitting. For example, data may be formatted, translated, or otherwise processed before sending.

The one or more statistical calculations may include such statistical analyses such as, but not limited to: Generalized AutoRegressive Conditional Heteroskedasticity ("GARCH") analysis, exponentially weighted moving average ("EWMA") analysis, a lag-filter analysis, mean, median, percentile, differencing, continuity of a measurement over a period of time, standard deviation, or any combination in any order thereof.

In an exemplary embodiment, the non-transitory machine readable storage medium may receive data from the at least two redundant sensors. The processor may calculate an average redundant measurement based on the data from the at least two redundant sensors. The processor may then compare the average redundant measurement to a preset threshold amount. If the average redundant measurement exceeds the pre-set threshold amount for a predetermined period of time, the processor may create an alert, which may signal the need to replace one or more of the at least two redundant sensors.

In an exemplary embodiment, the statistical calculations may include calculating statistical measures using nested functions. The formula for this calculation may include multiple nested functions and at least one sensor data set. In a non-limiting example, the formula for calculating statistical measures may include:

FUNCTION_2(FUNCTION_1(SENSOR_DATA_$n$, SENSOR_DATA_$n+1$, ... ))

where n is an integer value. In an exemplary embodiment n may be 2 or greater.

In an exemplary embodiment, a GARCH analysis may be used by the processor in order to calculate an average noise value which may occur amongst the redundant sensors. First, a noise value may be determined by finding the difference amongst the redundant sensors. This difference may then be parameterized as a function of time, which may be processed by at least one of the one or more statistical calculations before the processed difference is then further processed by a GARCH analysis. This can be expressed in the following manner:

GARCH(FUNCTION_2(SENSOR_DATA_1,SENSOR_DATA_2))

where FUNCTION_2 may be at least one of any of the one or more statistical calculations. Once the noise value exceeds the pre-set threshold value for the predetermined amount of time, the processor may create an alert, which may signal the need to replace one or more of the at least two redundant sensors.

In an exemplary embodiment, the data may exceed the pre-set threshold value for the predetermined amount of time intermittently. The processor may use a continuity of a measurement over a period of time analysis in order to account for one or more periods that the data did not exceed the pre-set threshold value. For example, if the calculated data exceeded the pre-set threshold value for a total of 10 minutes over two three day periods, the processor may treat the two-three day periods as a six day period. As such, the threshold value may be recognized to have been exceeded for 10 minutes over a six day period. Conversely, the processor may use a discontinuity of a measurement over a period of time analysis in order to account for one or more periods that the data did not exceed the pre-set threshold value. For example, if over a six day period, the sensor was out of alignment for all but 10 minutes, the time period would be considered as continuous. Therefore, the system may track one or more periods of time in which a threshold condition is met or not met over a period of time. The system may determine a continuous length of time, despite periods of discontinuity, by comparing the total continuous length of time to a period in which the threshold condition either meets or does not meet the threshold condition. If the period in which the threshold condition either meets or does not meet the threshold condition is sufficient high compared to the total continuous length of time, the total continuous length of time will be considered as meeting or not meeting, respectively depending on whether the system is testing for meeting or not meeting the condition, the threshold condition for the total continuous length of time.

In an exemplary embodiment, the two or more redundant sensors may take one or more measurements at a predetermined time interval. The processor may compare the measurements. If the difference between the measurements exceeds the pre-set threshold value for the predetermined amount of time, the processor may create an alert, which may signal that the process may have a problem.

In an exemplary embodiment, the average redundant measurement may be an EWMA analysis that is dependent on the resolution of the data from the two or more redundant sensors.

In an exemplary embodiment, the predetermined period of time may be determined based on the process the two or more redundant sensors are monitoring. For example, if the two or more redundant sensors are monitoring a process that may be prone to disruption, then the predetermined period of time may need to account for the amount of time the system may need to recover from a disruption. The predetermined time interval may also depend on historical data for the process the two or more redundant sensors are monitoring.

In an exemplary embodiment, the predetermined time interval may be on the order of seconds or minutes.

In an exemplary embodiment, a sample data set may be used in order to determine the predetermined period of time. A sample data set may be obtained by running a process and examining the data resulting from the process. Once obtained, the sample data set may be examined for outlier data, or data that is distant from the rest of the data. The predetermined period of time may be set such that it may be the shortest time required in order to capture all of the outlier data. The sample data set may be examined manually or by an automated process.

In an exemplary embodiment, the sensors may provide readings on a process or reaction such as, but not limited to, a pH, a temperature, a flow speed, or any combination thereof.

In an exemplary embodiment, the sensors may have additional features. For instance, at least one sensor may include a processor to allow for calculations on the sensor itself before transmitting the data for storage or further processing. Moreover, the on-board processor may include calibration and other sensor-related settings.

In an exemplary embodiment, the system and method may be used to detect problems in a process or reaction such as, but not limited to, a sensor malfunction, clogging, noise in the system, residue build-up, process disturbances, bubbling, or any combination thereof. Once one or more of the problems is detected, the system may create an alert, which may signal the need to attend to the process or reaction.

In an exemplary embodiment, the alert may be in any format suitable to inform relevant personnel, such as but not limited to, an email, a text message, a pop-up on a visual display communicating with the processor, or any combination thereof. The notice may be sent to one or more personnel. In some instances, the notice may state that no maintenance is required. Following any maintenance work, such information may be stored in a database and tracked.

FIG. 1 is a comparison of two boxplots which illustrates the difference between the data as received, or "No Statistical Measure" or "Unfiltered" data, and the data after the one or more statistical calculations have been applied, or "Statistical Measure" or "Filtered" data. The Statistical Measure boxplot 101 may be the result of applying one or more nested functions to the No Statistical Measure data. In other words, a function (e.g., FUNCTION_1 as shown below) is applied to filter data measured by the at least two redundant sensors. This can generally be expressed in the following manner:

FUNCTION_1(FUNCTION_2(SENSOR_DATA_1, SENSOR_DATA_2))

where FUNCTION_1 and FUNCTION_2 may be any of the one or more statistical calculations and SENSOR_DATA_1 and SENSOR_DATA_2 are respectively the data points collected by the at least two redundant sensors.

In contrast, for the boxplot of No Statistical Measure data 103, the additional filtering function is not applied, which generally can be expressed as:

FUNCTION(SENSOR_DATA_1,SENSOR_DATA_2)

Although plotting the results of different calculations of identical raw data, the boxplot of No Statistical Measure data 103 is less encompassing than the boxplot of the Statistical Measure data 101. This can be illustrated by the different sizes of the boxplots, as the Statistical Measure data 101 has a much larger box than the No Statistical Measure data 103. As such, the boxplot of the Statistical Measure data 101 has no outliers, while the boxplot of the No Statistical Measure data 103 has several outliers 105.

As shown by the several outliers 105 with Unfiltered data, a majority of sensors may have triggered an alarm for removal within a first third of an original maintenance schedule. As such, only a small fraction of sensors may have made it half-way through the schedule without an alarm. Accordingly, such "false positives" ultimately result in a maintenance schedule that is untenable and poorly followed. Moreover, this kind of schedule would also result in a poor performing process, as human error increases significantly with increasing human interaction with the process.

With the incorporation of one or more statistical calculations that smooth the data, a far more reasonable distribution of sensor maintenance may be achieved, as illustrated by the Statistical Measure boxplot 103. In particular, the maintenance may become more responsive than before, as illustrated by the lack of outliers in the Statistical Measure boxplot 101. With the maintenance more responsive, the sensors may be replaced less often, which may lead to less human interaction with the process and therefore a higher performing process.

Although the sensors may be pulled earlier than a static maintenance schedule may indicate, they may only be removed when performance is highly likely to be impacted. The process performance is improved and process metrics are believable which means that the dynamic nature of the maintenance schedule will be followed by the maintenance teams.

Figure 3A:
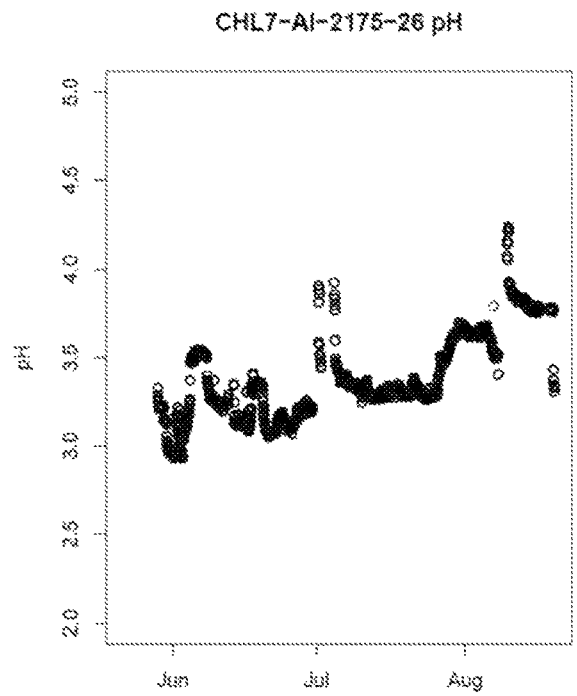
FIG. 3a illustrates data as received by a first redundant sensor plotted over a given time period.
Figure 3B:
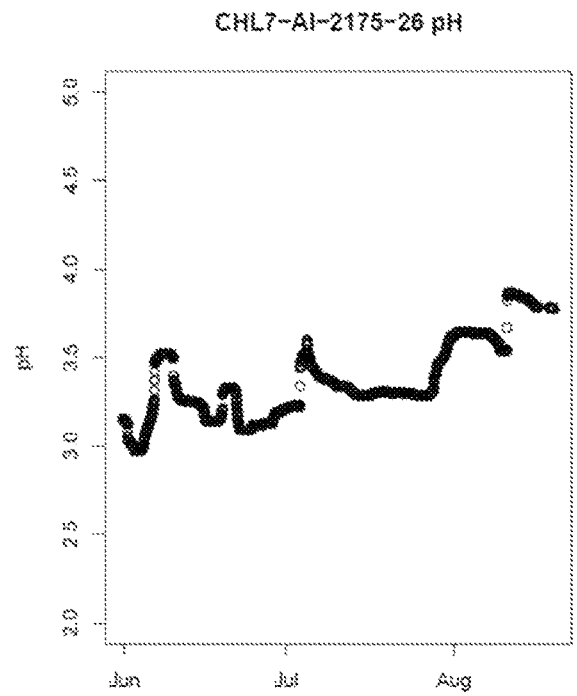
FIG. 3b illustrates data as received by a second redundant sensor plotted over a given time period.
Figure 3C:
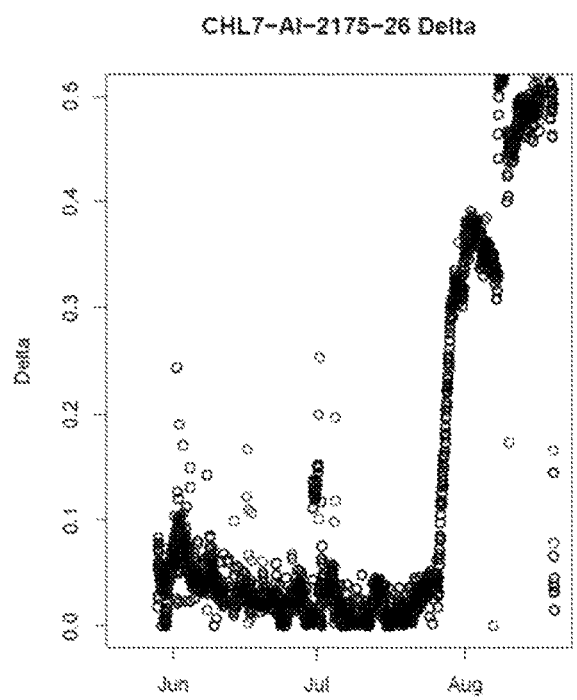
FIG. 3c illustrates the difference between the data as received between two redundant sensors.
Figure 3D:
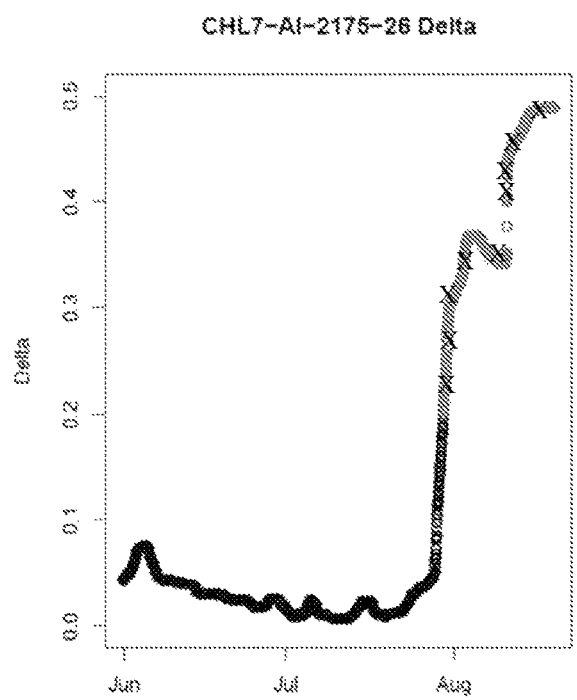
FIG. 3d illustrates the difference between the data, after one or more statistical calculations have been applied, between two redundant sensors.

FIGS. 2a through 3d illustrate the limitations of traditional pH diagnostics in recognizing poorly performing sensors. In FIGS. 2a and 3a, the Unfiltered pH data is plotted over a given time period. In FIGS. 2c and 3c, Unfiltered redundant difference data plots are shown. The redundant difference data plots illustrate the differences between the pH data measured in FIGS. 2a and 3a respectively. FIGS. 2b and 3b illustrate the sensor data after the application of the first function, or after the raw data is filtered or processed through a first statistical calculation by the processor. As shown, the first statistical calculation is a running average. In FIGS. 2d and 3d, the redundant difference data plots are filtered, or processed, through the second statistical calculation by the processor. As shown the second statistical calculation is EWMA.

As shown in FIGS. 2c and 3c, the performance between the two loops may be sub-optimal, as demonstrated by the large values depicted in FIGS. 2c and 3c. As such, the system may lack an accuracy needed for process control decisions. While it is easy to see this phenomenon when reviewed in hindsight over a 60 or 90 day period, it is difficult to detect in the moment and it is difficult to put a very precise number to the specific level of performance achieved.

On the other hand, FIGS. 2d and 3d illustrate the effect of the two or more statistical calculations on the data before making a determination of sensor failure or maintenance. As shown in FIGS. 2d and 3d, once processed through the one or more statistical calculations, the difference data plot may become much smoother and easier to plot. As such, poor sensor detection may be more easily detected. Therefore, results may be more dependable since there may be reduced human disruption to the process because the extension of the life of the sensor. Furthermore, it may become possible to alarm one of poor sensor performance without significant false positives or intermittent alarms as shown in the raw redundant difference data in 2c and 3c. The portions of the plot with "X" indicate the intervals under which an alarm for sensor replacement may have been triggered.

Specific use cases are provided herein for example only:

In a given application, two redundant, back-up sensors for measuring pH may be positioned in a system to measure the same pH parameter under the same conditions. An average of each sensor is calculated as an N-length median or EWMA, where N is based on the resolution of the data. The system is tested to determine if any periodic accountable anomalies exist. The average period is set for a time longer than the periodic accountable anomaly. The resolution of the data is set to obtain a sufficient statistical sampling size over the desired period of testing. Therefore, if the system is seen to have period bubbling that occurs for a period of an hour, the testing length may be set at two hours. The desired sampling size may be 300 data points. Therefore, the sampling rate is set at 12 second intervals. If the sensor is set to take data at another sampling rate, the usable sample points may be selected to approximate the desired sampling rate. For example, if the sensor provides a sample rate of 6 seconds, then every other data point may be used in the sensor monitoring. The difference of the average redundant pH is then compared to a threshold X over a period of Y days to send a warning. If the threshold is exceeded for Y time period with less than Z time period intermittent periods where the threshold condition is not met, a warning is triggered. The permissible Z periods permit the difference to not meet the threshold for short amounts to account for continuity over minor blips below the threshold, such as may be cause by noise or other momentary system occurrence. The X, Y, N, and Z values are all adjustable based on application, and may be on the order of days, such as 2 days, 6 days, or in hours, or in seconds.

In an exemplary application that may experience sensor coating or blockages, the noise readings of redundant sensors may be compared. For example, a noise reading from each sensor may be obtained, such as by using a GARCH analysis, for the first function. The difference between the noise readings may then be taken as the second function. In this way, the noise on redundant sensors may be compared. This may indicate, for example, a blocked sensor. If one sensor is noisy, while another redundant sensor is quiet, the quiet sensor may be blocked. The system may then be programmed to send an alert if the sensor noise difference is above a threshold for a predetermined amount of time. The warning may include a maintenance request to see if the low noise sensor is blocked. As a specific example, the average noise levels are monitored to send a warning if the differences exceed a threshold X for Y hours. First, an average noise is taken for each sensor, such as GARCH model of differenced data parameterized over various time ranges, and then run with a filter (median, EWMA, etc.). The filter is run based on the resolution of the data and the time range of the data in question. Thresholds can still be exceeded for hours with Z-second intermittent periods where it does not meet the threshold, to ensure continuity for minor blips below the threshold. Exemplary embodiments may include additional conditions, such as the noise level of one of the sensors below a certain threshold to indicate less noise than normal for the sensor. An additional condition may be a comparison of the noise level above a certain threshold to indicate a sensor having too much noise compared to a normal, to indicate if a valve is chattering or other identified system component.

In an exemplary application that experiences clogging, the comparison of the redundant sensor data may be the temperature between the two readings. In this case, one sensor may be upstream from another such that it may be a redundant sensor but not a redundant back-up sensor. In this case, if the temperature reading between two sensors exceeds a threshold for a period of time, the system may be configured to send a warning. Similar permissible periods in which the sensor do not exceed the threshold may be excused as described herein. The sensors readings may also first be analyzed, such as by applying a running average. The individual sensor readings may also be individually compared to a threshold to indicate one sensor below or above a threshold to suggest a system clog at the respective sensor.

Exemplary combinations of functions may include, for example, GARCH, EMWA, lag filter, median, mean, percentile, differencing, percent difference, continuity, continuity over a length of time, standard deviation, and combination thereof parameterized in any order. In an exemplary embodiment, analysis comprises a combination of filters, noise, and differencing functions. Exemplary filtering functions include averaging functions. Exemplary noise functions include volatility functions. Additional functional classes may include, for example fractal analysis, anomaly detection, breakout detection, and other forms of machine learning and pattern analysis. Different models of the same families are also considered within the scope of the invention as would be understood by a person of skill in the art.

What is claimed is:

1. A system for analyzing plant performance, comprising:
   at least two sensors to collect one or more data points, where the at least two sensors are redundant sensors;
   one or more non-transitory storage mediums, the one or more non-transitory storage mediums configured to receive the one or more data points; and
   a processor;
   wherein the one or more non-transitory storage mediums comprises one or more instructions for performing two or more statistical calculations; and
   wherein the processor carries out the instructions for performing two or more statistical calculations on the one or more data points from the at least two sensors to determine if one of the at least two sensors is faulty.

2. The system of claim 1, wherein a duration of the average over time is determined based on periodic accountable anomalies.

3. The system of claim 2, wherein the average over time comprises an exponentially weighted moving average.

4. The system of claim 3, wherein the time over which the average is taken is longer than a duration of a period for a known anomaly.

5. The system of claim 2, wherein the data is filtered to remove known anomalies.

6. The system of claim 2, wherein the at least two sensors are analytical sensors within an industrial processing plant.

7. The system of claim 6, wherein the at least two sensors are pH sensors.

8. The system of claim 7, wherein the one or more statistical calculations comprise Generalized AutoRegressive Conditional Heteroskedasticity; Exponentially Weighted Moving Average ("EWMA"); a lag-filter; mean; median; percentile; differencing; continuity of a measurement over a period of time; and standard deviation.

9. The system of claim 8, wherein the one or more statistical calculations are nested functions.

10. The system of claim 9, wherein the at least two redundant sensors are placed in proximity to each other.

11. The system of claim 10, wherein the system further comprises an output device.

12. A method for performing sensor maintenance using the system of claim 1, wherein the method comprises:
    the non-transitory storage medium receiving one or more data points from the redundant sensors;
    the processor performing one or more statistical calculations based on the data points to generate one or more processed data points;
    the processor comparing the one or more processed data points to a threshold value;
    the non-transitory storage medium creating an alert when the one or more processed data points exceed a threshold value for a period of time; and
    displaying the alert on an output device.

13. The method of claim 12, wherein the more than two sensors collect data at a predetermined frequency, and the predetermined frequency is dependent on the type of process being monitored by the more than two sensors.

14. The method of claim 13, wherein the non-transitory storage medium stores information regarding the alert.

* * * * *